United States Patent [19]

Lacklison et al.

[11] 3,819,944

[45] June 25, 1974

[54] PHOTOSENSITIVE MAGNETIC DEVICE

[75] Inventors: David Edward Lacklison, Crawley; Alexander David Annis, New Maldon; Ronald Ferguson Pearson, Beigate, all of England

[73] Assignee: U.S. Philips Corporation, New York, N.Y.

[22] Filed: Sept. 11, 1972

[21] Appl. No.: 287,970

Related U.S. Application Data

[63] Continuation of Ser. No. 127,283, March 23, 1971, abandoned.

[52] U.S. Cl. .................................. 250/353, 250/338

[51] Int. Cl. .......................................... G01n 27/00

[58] Field of Search ............ 250/83 R, 83.3 H, 336, 250/338, 353; 324/0.5 F

[56] References Cited

UNITED STATES PATENTS

| | | | |
|---|---|---|---|
| 3,681,602 | 8/1972 | Teale | 250/83.3 H |

*Primary Examiner*—Archie R. Borchelt

*Attorney, Agent, or Firm*—Frank R. Trifari; Carl P. Steinhauser

[57] ABSTRACT

In well-known photomagnetic materials such as YIG and Cd Cr Se the change of magnetic permeability on exposure to light can only be erased by raising the temperature of the material. When using ferric borate however, erasure can be effected magnetically at constant temperature. A range of substituted ferric borates is disclosed with a possible theory for the effect and an outline of its uses in information storage devices of various kinds.

6 Claims, 5 Drawing Figures

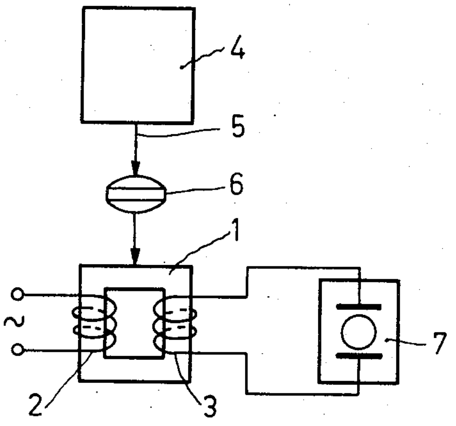

PHOTOSENSITIVE MAGNETIC DEVICE

This is a continuation, of application Ser. No. 127,283, filed Mar. 23, 1971.

This invention relates to photosensitive magnetic devices. It relates specifically to the provision of a material suitable for use in such a device.

A number of photosensitive magnetic materials such as silicon-doped yttrium iron garnet and gallium-doped cadmium chromium selenide have already been reported. These materials exhibit a photomagnetic effect in which changes in their magnetic permeability are brought about by illumination of the material with electromagnetic radiation. Upon illumination with radiation, generally at infrared wavelengths, the magnetic permeability was decreased and the coercive force was increased. In silicon-doped yttrium iron garnet these effects were permanent but with gallium-doped cadmium chromium selenide the effects observed were temporary at 77°K; however at 4.2°K the effects were irreversible and could only be erased by raising the temperature of the sample.

The present specification discloses magnetic materials in which different effects have been observed.

According to one feature of the invention there is disclosed a photosensitive magnetic device comprising a surface of a transparent magnetic material including $Fe^{3+}$ a magnetic property of which can be varied by suitable exposure of the surface to radiation of wavelength between 0.4 and 1.1 microns. The magnetic variation may be an increase in the magnetic permeability of the material. When the magnetic variation has occurred, this may be subsequently cancelled by a magnetic saturation or AC demagnetisation of the material, that is without raising the temperature of the sample.

Preferably the magnetic material is a ferric borate ($FeBO_3$). Alternatively the material may be ferric borate in which part of the iron has been substituted by a suitable element such as gallium or silicon.

The photosensitive magnetic device may be a device, for example, for information storage, image conversion, display or an integrating radiation detector. When used for the purpose of information storage, for instance, the device can enable erasure of previously written information to be effected when required without need for the temperature of the storage device to be changed.

The invention will be described with reference to the accompanying drawing the sole FIGURE of which shows a device for observing a magnetic permeability change in a ferric borate crystal.

Light having a wavelength between 0.4 and 1.1 micron impinges on a ferric borate ($Fe BO_3$) element 1 from a light source 4. Light 5 emanating from source 4 is focussed by a lens 3.

A coil 2 connected to a source of A-C is used to measure the susceptibility of the ferric borate element 1. An output coil 3 is connected to a display, or recording device 7 such as an oscilloscope. A change in permeability is reflected as a change in output.

In making experiments on photomagnetic materials it was found that unlike the effects known from silicon-doped yttrium iron garnet and gallium-doped cadmium chromium selenide, for ferric borate at 77°K, electromagnetic radiation increased the magnetic permeability, whilst the coercive force remained relatively unaffected. The increase in permeability could be maintained indefinitely at 77°K, and could be erased by magnetically saturating the sample. The active wavelengths for ferric borate lie in the wavelength range from 0.4 to 1.1 $\mu$.

At higher temperatures the increase in magnetic permeability thermally relaxed back to its original value immediately the electromagnetic radiation is removed. The relaxation time was of the order of one second at 180°K and of the order of a hundred seconds at 150°K. The variation of relaxation time with temperature was consistent with an activation energy lying in the range 0.3 to 0.4 *e*V.

The following pages describe a series of experiments which were carried out to enable the optical properties of ferric borate to be evaluated. Various devices were constructed to facilitate making measurements of the relevant parameters.

It was found that the effectiveness of electromagnetic radiation to produce a photoinduced change depended upon the wavelength $\lambda$ of the radiation. This could be characterised by which might be called the Responsivity R which was the percentage change in the magnetic susceptibility in one second for an intensity of illumination of 1 $\mu W/mm^2$.

At 77°K, for increases in magnetic permeability up to 50 percent, the changes were found to be proportional to both the intensity and time of illumination so that an integrating photomagnetic effect was obtained. An incident photon energy of $10^{+2}$ watt/cm$^2$ produced a 50 percent increase in permeability in 10 seconds.

At 77°K, light also induced non-linearities in the magnetic permeability. The permeability was measured by passing an AC current through a primary winding around a single-crystal toroid of ferric borate, and measuring an AC voltage induced in a secondary winding. This facility for introducing non-linearities was thought to be potentially useful particularly for the construction of various storage devices.

It was also noted that irradiating the sample whilst it was magnetically saturated did not produce any noticeable effect. Thus the presence of magnetic domains and hence domain walls appears to be necessary for the effect to occur.

Although the reasons for the occurrence of these photomagnetic effects are not fully understood at present, it is believed that they can be explained by a model in which the magnetic permeability is assumed to be predominantly due to domain wall motion. Thus the domain walls (probably Neel walls) will be situated in energy minima.

The permeability will be due to the movement of the walls in the energy "wells." It is assumed that illuminating the sample causes the energy minima to become shallower due to the presence of the domain wall.

Irradiating the sample was believed to create a difference between material inside and away from domain walls. The most obvious difference between materials inside and away from domain walls is the local direction of magnetisation. Hence:

a. Perhaps the photon absorption probability at some site(s) or centre(s) depends upon this direction,
b. and/or the radiation creates a uniaxial anisotropy in the easy plane of the sample, with the direction of the magnetisation (during irradiation) as symmetry axis. Any domain in the sample, when exposed to radiation, might develop an anisotropy energy density $$E'_k = K_o \cos 2(\phi - \phi')$$

where $\phi'$ is the angle between the magnetisation of the domain and some crystal axis. The value for $\phi'$ will vary within a domain wall.

If $K_o$ is positive, the irradiation will increase $E_k$ everywhere, and this increase can be reduced if the wall moves to a place it did not occupy during irradiation. Thus the wall forms an energy hill at the position it occupied. If the wall were in motion during irradiation, then the effect would be averaged over some larger volume, and would thus be less. This possibility indeed corresponds to what has been observed experimentally.

The foregoing descriptions of embodiments of the invention have been given by way of example only and a number of modifications may be made without departing from the scope of the invention. For instance, the invention is not necessarily restricted to the provision of a device in which the magnetic material used is ferric borate. Other suitable magnetic materials might also be used as alternatives.

What is claimed is:

1. A method of effectuating at an essentially constant temperature a change of the magnetic permeability of a transparent ferric borate crystal which presents at least one magnetic domain wall and is kept in the dark, by illuminating a surface of the crystal with a beam of electromagnetic radiation having a wavelength between 0.4 and 1.1 micron.

2. A method according to claim 1, wherein for effectuating a reversible change of the magnetic permeability the crystal is kept at a temperature of above 77°K.

3. A method according to claim 1, wherein for effectuating an irreversible change of the magnetic permeability the crystal is kept at a temperature below 77°K.

4. A method according to claim 3, wherein the magnetic state of the crystal before illumination is restored by magnetically saturating.

5. A method according to claim 1, wherein a change of the magnetic permeability is effectuated for the purpose of information storage, image conversion and radiation detection.

6. A method according to claim 3, wherein the magnetic state of the crystal before illumination is restored by demagnetizing the crystal with an alternating current.

* * * * *